United States Patent

[11] 3,528,353

| [72] | Inventor | William T. Colville<br>Williamsport, Pennsylvania |
|---|---|---|
| [21] | Appl. No. | 854,026 |
| [22] | Filed | Aug. 26, 1969 |
| [45] | Patented | Sept. 15, 1970 |
| [73] | Assignee | By mesne assignments, to<br>Eastman Kodak Company,<br>Rochester, New York<br>a corporation of New Jersey.<br>Continuation of Ser. No.<br>662,695, Aug. 23, 1967 |

[54] PHOTOGRAPHIC APPARATUS
4 Claims, 9 Drawing Figs.

[52] U.S. Cl. .................................................. 95/11,
95/11.5, 240/1.3
[51] Int. Cl. ............................................. G03s 19/00
[50] Field of Search .................................. 95/11, 11.5,
1.3, 2C

[56] References Cited
UNITED STATES PATENTS

| 501,800 | 7/1893 | Mallick | 95/11.5X |
| 961,021 | 6/1910 | Roesner | 431/92X |
| 3,353,467 | 11/1967 | Ernisse et al. | 95/11.5 |
| 3,369,468 | 2/1968 | Sapp, et al. | 95/11.5 |
| 3,353,468 | 11/1967 | Beach | 240/1.3X |
| 3,354,300 | 11/1967 | Parsons et al. | 240/1.3 |
| 3,374,720 | 3/1968 | Harvey | 95/11.5 |
| 3,447,433 | 6/1969 | Wick et al. | 240/1.3X |
| 3,464,335 | 9/1969 | Irwin | 95/11 |

*Primary Examiner*—Norton Ansher
*Assistant Examiner*—Robert P. Greiner
*Attorneys*—Norman J. O'Malley and Joseph C. Ryan ABSTRACT: A photographic still camera having a rotatable multilamp unit with percussive-type flashlamps, a film advancing mechanism, a shutter release arm and a shutter. The multilamp unit is secured to a socket that is coupled to the film advancing mechanism. Also coupled to the film advancing mechanism is a mechanism for cocking a hammer which has a firing pin mounted thereon. When the shutter release arm of the camera is activated the hammer is released and the firing pin mounted thereon is permitted to engage the primer cup of a flashlamp at a firing station. The camera is also provided with a mechanism which is activated by the hammer during the firing stroke to trip the shutter. The camera also has a clutch mechanism to index the multilamp unit socket in response to the operation of the film winding mechanism. When the socket has been indexed, rotary motion caused by further actuation of film winding mechanism will not be transmitted to the socket through the clutch mechanism.

Patented Sept. 15, 1970

INVENTOR
WILLIAM T. COLVILLE

BY *Joseph C. Ryan*
ATTORNEY

Patented Sept. 15, 1970
3,528,353
Sheet 2 of 2
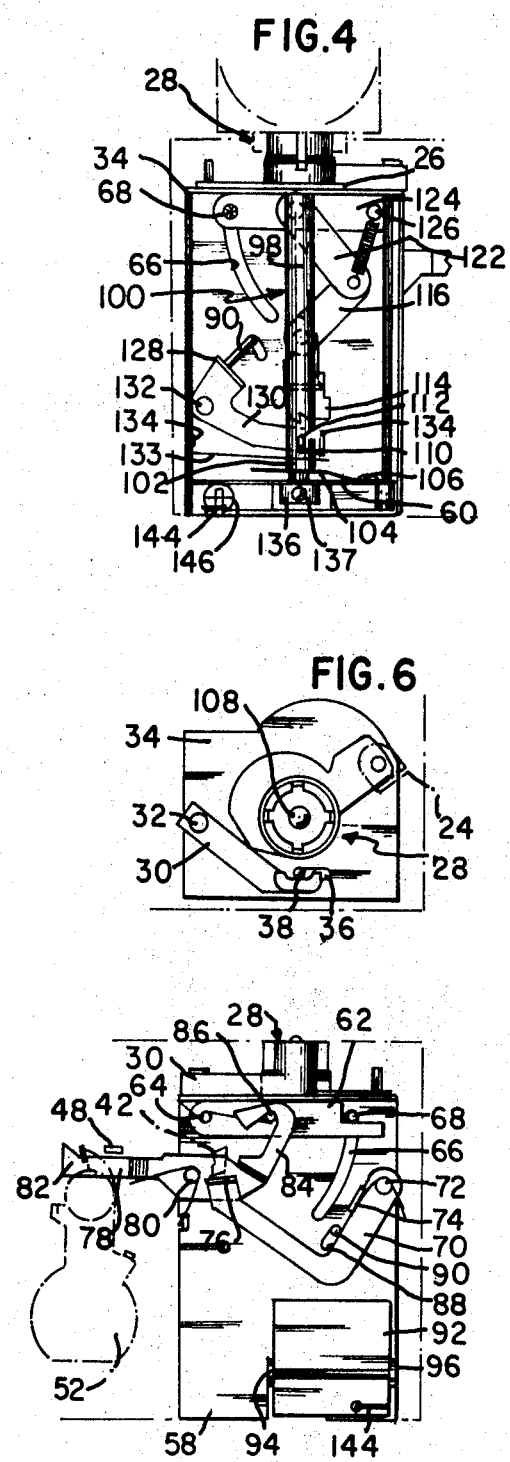
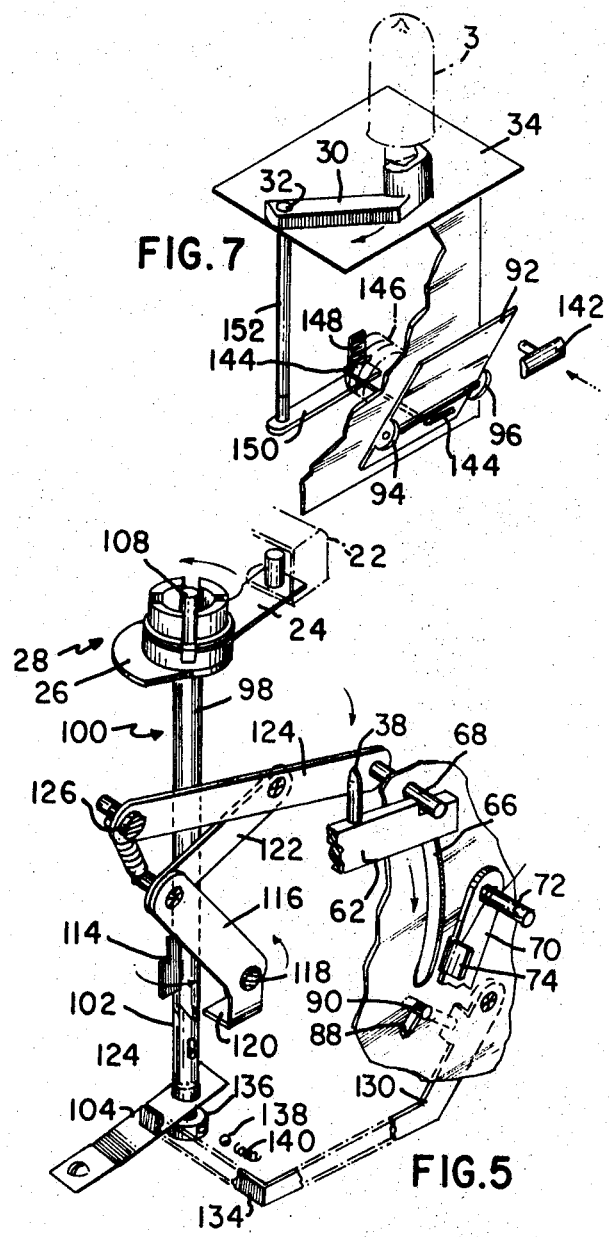
INVENTOR
WILLIAM T. COLVILLE
BY Joseph C. Ryan
ATTORNEY

PHOTOGRAPHIC APPARATUS

This is a continuation of application Ser. No. 662,695 filed August 23, 1967 now abandoned.

This invention relates to photographic apparatus and more particularly to camera mechanisms designed to fire a flashlamp synchronously with the exposure of the film with which the camera is provided.

For many years most cameras sold commercially have been provided with a source of electrical energy, such as dry cell batteries, which provide the means for energizing and firing flashlamps of the electric primer type. In some cases the batteries are located in a compartment provided therefor within the main body of the camera whereas in other cases the batteries are located in an attachment, usually called a flashgun. In the former arrangement the main body of the camera is also provided with a reflector and a suitable socket or receptacle to receive a flashlamp whereas in the latter the reflector and the lamp socket or receptacle are all part of the flashgun.

With the miniaturization of cameras and flashlamps, both the foregoing arrangements for providing an auxiliary light source for photography left more and more to be desired. In the case of flashguns, this "attachment" was entirely too large relatively speaking with respect to the miniaturized camera with which it was associated. In the case of cameras having a lamp socket or receptacle and a reflector built in, the miniaturized lamps became more and more difficult and awkward to handle, malfunctions increased and the built-in reflector took up too much space in the miniaturized camera.

The introduction of the multilamp photographic flashlamp unit, generally known as a flashcube, represented a significant advance in the art. It eliminated the need for flashguns and it eliminated the need for built-in reflectors. It also eliminated handling of the flashlamps individually. However, it did not eliminate the need for batteries.

One of the most chronic problems and perhaps most exasperating circumstance with which the average amateur photographer is confronted is weak batteries—batteries too weak to fire the lamp. The average amateur photographer will usually have a spare flashlamp or two but rarely if ever will he have a pair of spare fresh batteries. Thus a single shot, or more probably a whole sequence will be lost. Dry cell batteries, by their very nature, tend to lose their strength gradually over an extended period of time. Many amateur photographers take flash pictures less than half a dozen times a year, thus providing more than enough time between uses for the batteries to deteriorate from strong to weak—from operativeness to inoperativeness.

In the co-pending application of O. H. Biggs et al. Ser. No. 600,149 filed December 8, 1966, entitled "Photoflash Lamp", there is disclosed a percussive-type flashlamp which requires no batteries for its operation and a mechanism integrated into a camera for firing it. In the co-pending application of George W. Parsons, Ser. No. 662,743 filed August 23, 1967, entitled "Photographic Flashlamp Unit", filed on even date herewith and assigned to the same assignee, there is disclosed a multilamp photographic flashlamp unit of the flashcube type having flashlamps of the percussive-type.

The principal object of this invention is to provide a camera with a mechanism for firing flashlamps of the percussive-type.

Another object is to synchronize the lamp firing mechanism with the shutter actuating mechanism.

A further object is to provide a camera with a mechanism for firing flashlamps of the percussive-type arranged in a multilamp photographic flashlamp unit of the flashcube type.

These and other objects, advantages and features are attained, in accordance with the principles of this invention, by providing a camera with a mechanism for firing a percussive-type flashlamp, said mechanism including means for controlling the shutter opening mechanism whereby the desired synchronization is assured. More particularly, in the specific embodiment illustrated and described herein, the camera is provided with a firing pin, a hammer to actuate it and means, controlled by the actuation of the hammer, to trip the shutter. Since the lamps are of the percussive-type, means are provided for securing them in position on the camera during firing.

In the accompanying drawing illustrating a specific embodiment of this invention, FIG. 1 is a top plan view of a camera with the cover removed showing the top of the camera compartment within which the apparatus of this invention is located and the linkage connecting it to the film advancing mechanism of the camera.

FIG. 3 is a front elevational view of the camera compartment showing particularly the hammer and its latch, and the associated shutter tripping mechanism.

FIG. 4 is a rear elevational view of the camera compartment showing particularly the hammer cocking and flashcube rotating mechanisms. The means for disconnecting the hammer cocking mechanism from the flashcube rotating mechanism after the flashube has been rotated 90° is also shown.

FIG. 5 is an exploded fragmentary detail of the interrelated portions of the hammer cocking and latching mechanisms and the flashcube rotating mechanism.

FIG. 6 is a top plan view of the camera compartment showing particularly the flashcube socket, the finger for holding the flashcube in its socket during firing and the automatic means for retracting the finger to permit rotation of the flashcube during cocking of the hammer.

FIG. 7 is a fragmentary detail of a manually operated means for retracting the flashcube holding finger.

Figure 1:
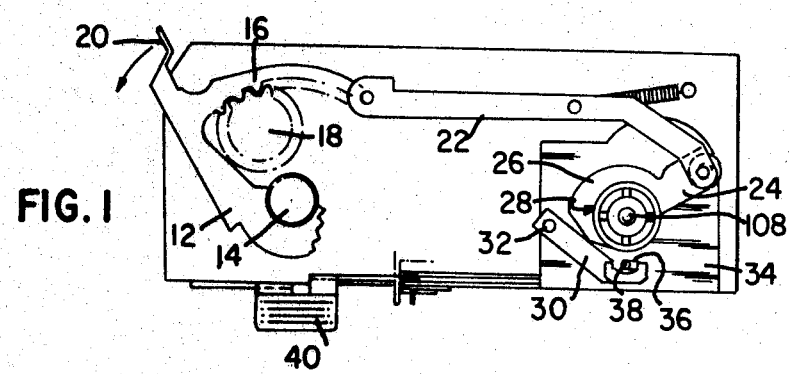
Figure 2:
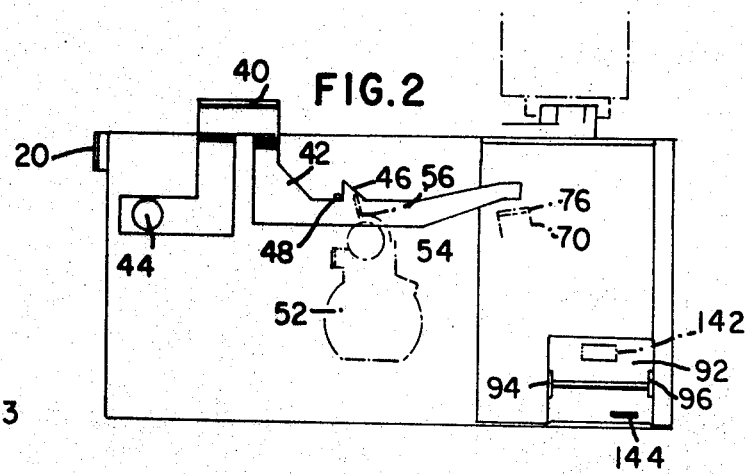
FIG. 2 is a front elevational view of the camera of FIG. 1 with the cover removed showing the shutter release lever and its relationship to the camera compartment within which the apparatus of this invention is located.
Figure 8:
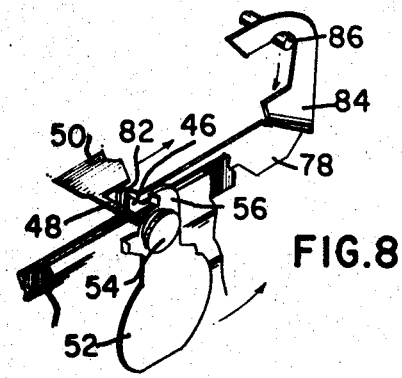
FIG. 8 is a fragmentary detail of the camera shutter and its cocking, releasing and tripping mechanisms.

Referring now to the drawings, a camera provided with a specific embodiment of the apparatus of this invention is shown in the uncocked position, i.e., the position of the parts immediately after a picture has been taken except that in FIGS. 2 and 8 the shutter has been shown cocked for clarity of illustration. As shown in FIGS. 1 and 2, the righthand side of the camera body as viewed in these figures is provided with a compartment within which the apparatus of this invention, as illustrated particularly in FIGS. 3, 4 and 6, is located. Actuation of the apparatus of this invention is effected by operation of the film advancing lever 12 as shown in FIG. 1. The film advancing lever 12 is pivotally mounted near the end of one leg thereof on a pivot 14. The other leg thereof is a rack 16 which meshes with a pinion 18. Advancement of the film to the next exposure is effected by moving the lever handle 20 in the direction of the arrow as shown in FIG. 1.

Advancement of the film in the manner just described also actuates the apparatus of this invention through link 22. As shown particularly in FIG. 1, one end of link 22 is connected to the rack 16 and the other end thereof is connected to an ear 24 of a cam 26 attached to the upper end of a sleeve disposed immediately beneath flashcube socket 28. It will be noted in this figure that the cam 26 engages a flashcube locking finger 30 pivotally mounted at 32 on mounting plate 34. It will also be noted in this figure that the mounting plate 34 is provided with a slot 36 through which a firing pin 38 is caused to move. The contour of the cam 26 is such that during operation of the apparatus of this invention it will effect rotational displacement of the finger 30 out of locking relationship with respect to a flashcube.

FIG. 2 illustrates the relative location of a camera shutter cocking and release mechanism with respect to the apparatus of this invention. A shutter release plate 40 comprises the exposed portion of the shutter release mechanism as illustrated in FIGS. 1 and 2. The shutter release plate 40 is an integral part of a shutter release arm 42 pivotally mounted at 44 on the camera body. The shutter release arm 42 is provided with a detent 46 which, as shown in FIG. 2, restrains and holds the projecting finger 48 of a spring-loaded shutter striking plate 50 (FIG. 8) mounted on the top of the camera body in a conventional manner. Shutter 52 is pivotally mounted at 54 on the camera body and has an upstanding ear 56. Thus, actuation of the shutter release plate 40 displaces the shutter release arm 42 about its pivot 44 and displaces the detent 46 thereof to release the finger 48 of the shutter striking plate 50 and permit it to trip the shutter 52 by displacement of the ear 56 thereof.

The major components of the apparatus of this invention are organized about a vertical mounting plate 58 and a pair of horizontal mounting plates 34 and 60 as shown particularly in FIGS. 3—6. As described above in the brief description of the figures, FIG. 3 is a front elevational view of the camera compartment within which the apparatus of this invention is located and FIG. 4 is a rear elevational view thereof. Thus one side of the vertical mounting plate 58 is shown in FIG. 3 and the other side thereof is shown in FIG. 4.

As shown in FIG. 3, a hammer 62 is pivotally mounted at 64 on the mounting plate 58. The mounting plate 58 is provided with an elongated slot 66 through which a hammer cocking pin 68 extends, this pin, as shown in FIG. 3, normally overlying the hammer 62 near the free end thereof. A spring-loaded, substantially L-shaped hammer latch 70 is pivotally mounted on the vertical mounting plate 58 at 72. The hammer latch 70 is provided with a laterally extending tab 74 on one leg thereof and another laterally extending tab 76 at the free end of the other leg thereof. As will be described more fully below, when the hammer 62 is rotated about its pivot 64 clockwise as viewed in FIG. 3, the free end thereof engages the laterally extending tab 74 and cams the hammer latch 70 in a counterclockwise direction as viewed in FIG. 3 until the free end of the hammer 62 has moved past the tab 74 and interlocked therewith.

A shutter tripping lever 78 is pivotally mounted intermediate its ends on the vertical mounting plate 58 at 80. This spring-loaded member is provided with a detent 82 at one end thereof and a hook 84 at the other end thereof. The detent 82 normally retains the shutter 52 in the cocked position due to its interlocking engagement with the finger 48 of the shutter striking plate 50. A pin 86 projects from a side face of the hammer 62 and extends into the hook 84. As will be described more fully below, the hook 84 defines a camming surface for the pin 86 when the hammer 62 is displaced, particularly during firing.

The vertical mounting plate 58 is provided with a slot 88 adjacent to the elongated slot 66 within which the hammer cocking pin 68 moves. A pin 90 extends through this slot and is part of a mechanism mounted on the opposite face of mounting plate 58 illustrated in FIG. 4 and described below.

A spring-loaded rocker plate 92 is pivotally mounted at 94 and 96 on the mounting plate 58. The mechanism associated with this rocker plate 92 is illustrated in FIG. 7 and will be described in connection therewith.

As indicated above, FIG. 4 is an elevational view illustrating the mechanisms organized about the vertical mounting plate 58 on the side opposite that shown in FIG. 3 and described immediately above. The structure illustrated in FIG. 4 consists essentially of the hammer cocking mechanism and the flashcube rotating mechanism. The flashcube rotating mechanism will be described first.

As noted above in the description of FIG. 1, the apparatus of this invention is actuated by the operation of the film advancing mechanism of the camera through the link 22 which is connected to the ear 24 on cam 26 (FIG. 6). Returning now to FIG. 4, the cam 26 is mounted on the upper end of the upper component 98 of a two-piece sleeve 100, the lower component of said sleeve being identified by the reference number 102. The two-piece sleeve 100 is rotatably supported between the horizontal mounting plates 34 and 60. The adjacent edges of the two components 98 and 102 of the sleeve 100 are provided with four mating teeth and thus interlock when engaged. The lower component 102 of the sleeve 100 is supported by and rests on a leaf spring 104 which is secured at one end thereof at 106 on the horizontal mounting plate 60. This leaf spring 104 normally maintains the components of the two-piece sleeve in engagement with one another so that rotation of one component will be transmitted to the other component.

As noted above in the description of FIG. 1, and as may also be noted in FIGS. 3—6, a flashcube is mounted in socket 28. One of the components of this socket is a shaft 108 which extends through the two-piece sleeve 100. The lower end of shaft 108 is provided with a projecting pin 110 which extends through a slot 112 provided therefor in the lower component 102 of the two-piece sleeve 100. Thus, rotation of the upper sleeve component 98 by the cam 26 secured thereto effects rotation of the flashcube socket 28 through the lower sleeve component 102 and pin 110. During one full advancing stroke of the film advancing lever 12 the flashcube socket 28 and the flashcube mounted thereon will be rotated 90°.

The hammer 62 is cocked during the aforesaid stroke by the rotation of the upper sleeve component 98. As shown in FIGS. 4 and 5, the upper sleeve component 98 is provided with a projecting tab 114 near the lower end thereof. When the upper sleeve component 98 is rotated to effect rotation of the flashcube socket 28, the tab 114 projecting therefrom actuates the hammer cocking mechanism. The hammer cocking mechanism comprises a bell crank lever 116 pivotally mounted at 118 on the vertical mounting plate 58, said lever having a tab 120 projecting laterally from one leg thereof and lying in the path of the tab 114 of the rotating upper sleeve component 98. A link 122 connects the other end of the bell crank lever 116 to an arm 124 on one end of which the hammer cocking pin 68 is mounted, the other end thereof being pivotally mounted at 126 on the mounting plate 58. Thus, when the upper sleeve component 98 is rotated to rotate the flashcube socket 28, the tab 114 thereof rotates the bell crank lever 116 which, through the link 122, draws the arm 124 downwardly and causes the hammer cocking pin 68 mounted thereon and extending through the plate 58 to displace the hammer 62 clockwise about its pivot 64 as shown in FIG. 3 until its free end interlocks with the tab 74 on the hammer latch 70 to thereby latch the hammer in a cocked position.

The flashcube socket 28 has now been rotated 90° and the hammer 62 has been cocked. If more than one advancing stroke of the film advancing lever 12 is necessary to advance the film to the next exposure, means are provided for preventing further rotation of the flashcube socket 28 and the displacement of the hammer 62 during such additional strokes or portions thereof as may be required. These means will now be described.

As shown in FIG. 3 and as noted above in connection with the description thereof, the vertical mounting plate 58 is provided with a slot 88 adjacent to the elongated slot 66 which defines the path of movement of the hammer cocking pin 68. It was also noted above in connection with the description of FIG. 3 that a pin 90 extends through this slot 88. As the hammer 62 approaches its cocked position interlocking with the tab 74 on the latch 70, the free end of the hammer 62 will engage and displace this pin 90 from the upper end of the slot 88 to the lower end thereof as viewed in FIG. 3. This displacement of the pin 90 actuates a mechanism for preventing further rotation of the flashcube socket 28 after it has been rotated 90°. The mechanism for doing this is shown in FIGS. 4 and 5. As shown in FIGS. 4 and 5, the pin 90 is bent at 90° and comprises a projecting member mounted on a laterally extending tab 128 on one end of a bell crank lever 130 pivotally mounted at 132 on the vertical mounting plate 58. The other end of the bell crank lever 130 is also provided with a tab 134. Thus, displacement of the pin 90 from the upper to the lower position in slot 88 by the hammer 62 as it approaches its cocked position, causes clockwise rotation of the bell crank lever 130 about its pivot 132 as viewed in FIG. 4 so that the tab 134 projecting from an end thereof engages and depresses leaf spring 104 a distance sufficient to permit the lower sleeve component 102 to disengage itself from the upper sleeve component 98. Thus, any further actuation of the film advancing lever 12 to advance the film to the next exposure will cause further rotation of the upper sleeve component 98 through the cam 26 secured thereto but this further rotational movement will not be transmitted to the flashcube socket 28 or the shaft 108 thereof because the connection between the upper sleeve component 98 to the shaft 108 through the lower sleeve component 102 and the pin 110 has been broken. A spring wire 133 secured at 134 frictionally engages the lower sleeve component 102 and helps to hold it in the down or disengaged position with respect to the upper sleeve component 98. It should be noted at this point that the flashcube socket 28 and its shaft 108 are held at the 90° rotation position by a ball and socket arrangement shown in FIGS. 4 and 5 and comprising collar 136 pinned to the lower extremity of the shaft 108, ball 138 and spring 140. The collar 136 has four sockets 137 formed therein so that with each 90° rotation of the shaft 108 the spring-loaded ball 138 will seat in a socket 137 and hold the flashcube socket in its desired position.

Since further actuation of the film advancing lever 12 beyond the single stroke already described will cause the upper sleeve component 98 to rotate because of the connection thereto through link 22 and cam 26, this further rotation of the upper sleeve component 98 will also actuate the hammer cocking pin mechanism since the tab 114 on the upper sleeve component 98 will engage and displace the bell crank lever 116 and its associated mechanism. However, since the hammer 62 has already been cocked and is held in position by latch 70, actuation of the hammer cocking pin mechanism will merely cause the hammer cocking pin 68 to move through its slot 66 freely without displacing or disturbing the cocked hammer.

When the film advancing lever 12 has been actuated a sufficient number of times to advance the film to the next exposure, the camera is then ready for the taking of the next picture. This takes place when the photographer depresses the shutter release plate 40 as viewed in FIGS. 1 and 2. As is illustrated in FIG. 2, a conventional shutter release arm 42, of which the shutter release plate 40 is a part, is pivotally mounted at 44 on a camera body and depression of plate 40 causes the arm 42 to rotate clockwise about its pivot 44 to displace the detent 46 thereof enough to free the finger 48 of the shutter striking plate 50 (FIG. 8) and permit it to trip the shutter 52. In this case however, even though the shutter striking plate 50, and more particularly its projecting finger 48, has been released by the displacement of detent 46 of the shutter release arm 42, the shutter 52 will not be tripped because the finger 48 is still restrained by the detent 82 (FIGS. 8 and 3) by the spring-loaded shutter tripping lever 78.

Figure 9:
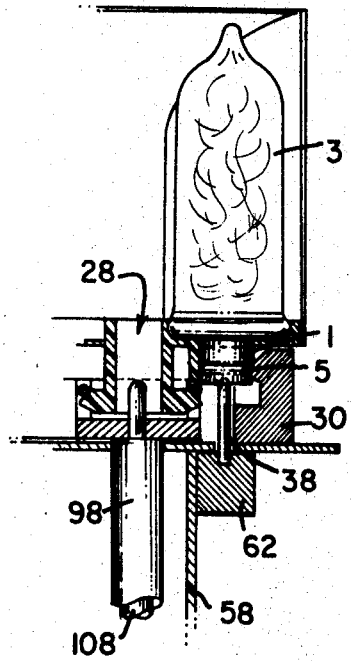
FIG. 9 is a fragmentary detail on an enlarged scale of one lamp of a flashcube in firing position and immediately associated parts.

Although the mechanism just described prevents tripping of the shutter 52 even after the detent 46 on the shutter release arm 42 has been displaced enough to permit it, this displacement of the shutter release arm 42 does trip the hammer latch 70 when the free end of the arm 42 engages and depresses the laterally extending tab 76 on an end of the L-shaped hammer latch 70 (FIGS. 2 and 3). This causes counterclockwise rotation of the hammer latch 70 about its pivot 72 as viewed in FIG. 3 and thus releases the hammer 62 from interlocking engagement with the tab 74 on the hammer latch 70, thus permitting the spring-loaded hammer with the firing pin 38 projecting from the top face thereof to drive upward and strike the primer cup 1 of the lamp 3 as shown in FIG. 9. As the hammer 62 drives upward rotating counterclockwise about its pivot 64 as viewed in FIG. 3, the pin 86 projecting laterally therefrom rides along the inside face of the major arm of the hook 86 until it bottoms in the bight thereof. At this point the firing pin 38 on the hammer 62 is fast approaching engagement with the primer cup 1 to fire the lamp 3. Further movement of the pin 86 after engagement with the bight of the hook 84 causes the shutter trip lever 78, of which the hook 84 is a part, to rotate counterclockwise about its pivot 80 and thus displace the detent 82 at the other end thereof out of restraining engagement with the finger 48 of the shutter striking plate 50 (FIG. 8) and thus permit the finger 48 to strike the upstanding ear 56 and trip the shutter 52 to expose the film and take the picture.

From the foregoing it will be apparent to those skilled in the art that the shape and relative location of the hook 84 comprises a means for adjusting the shutter tripping time with respect to the lamp firing time to obtain the desired synchronization.

As is shown quite clearly in FIG. 9, the flashcube locking finger 30 interlocks with a groove 5 formed in the primer cup 1 to hold the lamp 3 securely in position particularly during firing. However, as noted above in connection with the description of this locking finger 30, it is a spring-loaded member normally urged inwardly in the locking position. Thus it should be in the unlocked or retracted position not only to permit rotation of the flashcube when it is seated in its socket 28, but it should also be retracted or disengaged whenever insertion or withdrawal of the flashcube with respect to its socket 28 is desired. As described above, the locking finger 30 is retracted to permit rotation of the flashcube by the action of the cam 26 (FIGS. 1, 4 and 6).

The mechanism for retracting the locking finger 30 manually whenever desired is illustrated in FIGS. 2, 3 and 7. As shown in full in FIG. 7 and in phantom in FIG. 2, the front of the camera is provided with a button 142 in register with the spring-loaded rocker plate 92. When the photographer depresses this button 142 it pushes in on the spring-loaded rocker plate 92 and causes it to rotate about its pivots 94 and 96. A wire 144 is hooked to the lower segment of the rocker plate 92, extends through a compression spring 146 (FIG. 7) and is connected at its other end to a tab 148 on an arm 150 which is attached to the lower end of a connecting rod 152, the upper end of which defines the pivot 32 for the locking finger 30 as described above. Thus whenever an operator wishes to displace the locking finger 30 to permit a flashcube to be inserted or withdrawn freely from its socket 28, he depresses the button 142 on the front of the camera. This rocks plate 92, draws arm 150 clockwise as viewed in FIG. 7, rotates the connecting rod 152 in a similar direction and thus effects the desired displacement of the locking finger 30.

An operating cycle of the apparatus of this invention will now be described briefly. As noted above at the beginning of the description of the specific embodiment, the apparatus as illustrated is shown in the position which the components thereof assume immediately after a picture has been taken, except that the shutter is shown cocked in FIGS. 2 and 8 and a lamp is shown at the instant of firing in FIG. 9. If a flashcube is to be used for the taking of the next picture, the operator prepares the flashcube socket 28 to receive it by depressing the button 142 (FIGS. 2, 3 and 7) on the front of the camera to rotate the rocker plate 92 and, through its associated mechanism, to displace the locking finger 30 from its normally closed position with respect to the flashcube socket 28. With the socket 28 now clear, a flashcube may be properly seated thereon and then the operator can release the button 142 and the spring-loaded locking finger 30 will return to its normally closed position interlocking in the groove 5 of a lamp 3 as shown in FIG. 9.

The next step is for the operator to advance the film and, at the same time, set the apparatus of this invention for firing the lamp. Advancement of the film to the next exposure is effected by operation of the film advancing lever 12 (FIGS. 1 and 2). Actuation of the film advancing lever 12 not only advances the film and cocks the shutter in the usual manner but, through the link 22, it also rotates the flashcube socket 28 90° and cocks the hammer 62.

Rotation of the flashcube socket 28 is effected by the movement of the link 22 rotating the cam 26 secured to the upper sleeve component 98 of the two-piece sleeve 100, the lower component 102 thereof being connected to the shaft 108 of the flashcube socket 28 through pin 110 (FIGS. 3—6).

Cocking of the hammer 62 is effected by the rotation of the upper sleeve component 98 through the tab 114 projecting therefrom. During rotation of the upper sleeve component 98 the tab 114 actuates the linkage system which causes the hammer cocking pin 68 to move downwardly within its slot 66 and rotate the hammer 62 clockwise as viewed in FIG. 3 until it interlocks with the hammer latch 70 (FIGS. 3—5).

In order to permit such further actuation of the film advancing lever 12 as may be necessary in order to advance the film to the next exposure without disturbing the rotated flashcube and the cocked hammer, a break in the system is effected. As the hammer 62 nears its cocked position, it displaces the pin 90 from the upper to the lower end of its slot 88. This displacement of the pin 90 rotates the bell crank lever 130, depresses the leaf spring 104 and thus permits the lower sleeve component 102 to drop out of interlocking engagement with the upper sleeve component 98 and thus break the connection therebetween. Thus further rotation of the upper sleeve component 98 will not be transmitted through the lower sleeve component 102 and the pin 110 to the shaft 108 of the flashcube socket 28.

Further rotation of the upper sleeve component 98 during further actuation of the film advancing lever 12 will be transmitted through the tab 114 to the linkage system which actuates the hammer cocking pin 68. However, the hammer 62 will remain cocked and the pin 68 will merely move freely in its elongated slot 66.

A picture is taken when the operator depresses the shutter release plate 40. This rotates the shutter release arm 42 (FIG. 2) and causes its detent 46 to free the finger 48 of the spring-loaded shutter striking plate 50 to trip the shutter 52. However, the detent 82 of the shutter tripping lever 78 (FIG. 8) will still hold the finger 48 and prevent tripping of the shutter 52. As shown in FIG. 2, the free end of the shutter release arm 42 overlies the tab 76 of the hammer latch 70 (FIG. 3). Thus, as the shutter release arm 42 is rotated clockwise as viewed in FIG. 2, it displaces the hammer latch 70 counterclockwise as viewed in FIG. 3 thus releasing the hammer 62 which drives forward to advance the firing pin 38 upstanding thereon into engagement with the primer cup 1 of the lamp 3 (FIG. 9). As the hammer 62 approaches the end of this stroke, the pin 86 extending laterally therefrom and extending through the hook end 84 of the shutter tripping lever 78 trips the lever, thus displacing the detent 82 thereof to free the finger 48 of the spring-loaded shutter striking plate 50 and permit it to trip the shutter 52. In this way the timing of the tripping of the shutter is dependent upon the movement of the firing pin hammer and thus the desired synchronization is assured.

I claim:

1. A photographic camera for exposing film receivable in the camera and usable with a multilamp flash unit; the unit including a plurality of flash devices adapted to be sequentially fired by the camera; the camera comprising:

a film winding mechanism operative to advance film in the camera;

a socket for detachably receiving the flash unit on the camera;

a driver having a latched position from which said driver is releasable to effect both operation of the shutter and firing of a flash device at a firing position, said driver including an integral firing pin for engaging a respective flash device to effect percussive ignition of the device;

means for indexing the socket in response to operation of the film winding mechanism and to locate respective ones of the flash devices at the firing position, said means including a first member coupled to said film winding mechanism to be moved between first and second positions in response to operation of the mechanism, a second member coupled to said socket and movable between first and second positions to index the socket, and a clutch setable to one condition wherein said first and second members are coupled for concurrent movement between their first and second positions, and another condition wherein said first and second members are not coupled for concurrent movement; and means for setting said clutch to its one condition when said driver is released and for setting said clutch to its other condition when said driver is in its latched position.

2. A photographic camera for exposing film and usable with a multilamp flash unit; the unit including a plurality of percussively ignitable flash devices; the camera comprising:

a camera casing for receiving film to be exposed in the camera;

a shutter mechanism operative to expose film received in the casing;

a release member accessible from outside the casing and for effecting operation of the shutter to expose the film;

a film advancing mechanism on said casing operative to advance film through the casing after each exposure;

means for detachably receiving the flash unit on the camera and for coupling the flash unit and the film advancing mechanism to index respective ones of the flash devices to a firing position in response to operation of said film advancing mechanism;

a driver and integral firing pin having a cocked condition from which the driver and pin are releasable to engage and effect firing of the flash device;

means actuatable by said film advancing mechanism for cocking the driver;

means actuatable by said release member for releasing the driver to effect firing of the flashlamp; and means actuatable by said driver upon release thereof for operating said shutter mechanism.

3. A photographic camera as claimed in claim 2 and further comprising a releasable flash-unit latch for positively securing the unit on the camera.

4. A photographic camera as claimed in claim 3 and further comprising manually actuatable means for releasing said flash-unit latch to permit insertion and removal of a flash unit on the camera.